(12) United States Patent
Yanagishima et al.

(10) Patent No.: US 8,896,454 B2
(45) Date of Patent: Nov. 25, 2014

(54) EXIT MONITOR

(75) Inventors: Ryohei Yanagishima, Ome (JP);
Katsuhito Ito, Fuchu (JP); Ryoichi Saito, Hino (JP); Satoshi Takano, Hachioji (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 570 days.

(21) Appl. No.: 13/382,148

(22) PCT Filed: Jun. 24, 2010

(86) PCT No.: PCT/JP2010/004198
§ 371 (c)(1),
(2), (4) Date: Mar. 23, 2012

(87) PCT Pub. No.: WO2011/001638
PCT Pub. Date: Jan. 6, 2011

(65) Prior Publication Data
US 2012/0176246 A1 Jul. 12, 2012

(30) Foreign Application Priority Data
Jul. 3, 2009 (JP) ................................. 2009-158853

(51) Int. Cl.
*G08B 17/12* (2006.01)
*G01D 18/00* (2006.01)
*G01T 1/169* (2006.01)

(52) U.S. Cl.
CPC ..................................... *G01T 1/169* (2013.01)
USPC ....................................... 340/600; 250/252.1

(58) Field of Classification Search
CPC ............. G01T 1/17; G01T 1/20; G01T 1/167; B65F 1/02
USPC .................. 340/600; 250/252.1, 394, 455.11, 250/515.1, 517.1
See application file for complete search history.

(56) References Cited

U.S. PATENT DOCUMENTS

| 2,976,421 A | * | 3/1961 | Bayfield | 250/385.1 |
| 4,655,235 A | * | 4/1987 | Scott, Jr. | 134/99.1 |
| 4,731,536 A | * | 3/1988 | Rische et al. | 250/394 |
| 4,850,380 A | * | 7/1989 | Koslow | 134/56 R |
| 5,041,728 A | * | 8/1991 | Spacher et al. | 250/366 |

(Continued)

FOREIGN PATENT DOCUMENTS

| JP | 55-161288 U | 11/1980 |
| JP | 05-302980 A | 11/1993 |

(Continued)

*Primary Examiner* — Benjamin C Lee
*Assistant Examiner* — Sigmund Tang
(74) *Attorney, Agent, or Firm* — Rabin & Berdo P.C.

(57) ABSTRACT

To examine a contamination state of a worker having worked in a radiation controlled zone, a first unit detects contamination of a front or back surface of the worker and outputs a first signal indicating a contamination state of the surface. A second unit detects contamination of an arm's inner side surface of the worker and outputs a second signal indicating a contamination state of the arm's side surface. A third unit detects contamination of a trunk's side surface of the worker and outputs a third signal indicating a contamination state of the trunk's side surface. A processing unit detects the presence of contamination of the front or back surface and the armpit's both sides based on the outputted first signal, on the second signal output when the second unit moves up together with the third unit, and on the third signal output when the third unit moves up.

13 Claims, 13 Drawing Sheets

(56) References Cited

U.S. PATENT DOCUMENTS

| | | | |
|---|---|---|---|
| 8,637,842 B2* | 1/2014 | Case et al. | 250/517.1 |
| 8,710,460 B2* | 4/2014 | Dayton | 250/455.11 |
| 8,822,944 B2* | 9/2014 | Hora et al. | 250/394 |
| 2009/0114833 A1* | 5/2009 | Green et al. | 250/388 |
| 2013/0313419 A1* | 11/2013 | Nakazawa et al. | 250/252.1 |

FOREIGN PATENT DOCUMENTS

| | | |
|---|---|---|
| JP | 10-206551 A | 8/1998 |
| JP | 11-064522 A | 3/1999 |
| JP | 2003-215250 A | 7/2003 |
| JP | 2005-043272 A | 2/2005 |
| JP | 2005-043273 A | 2/2005 |

* cited by examiner

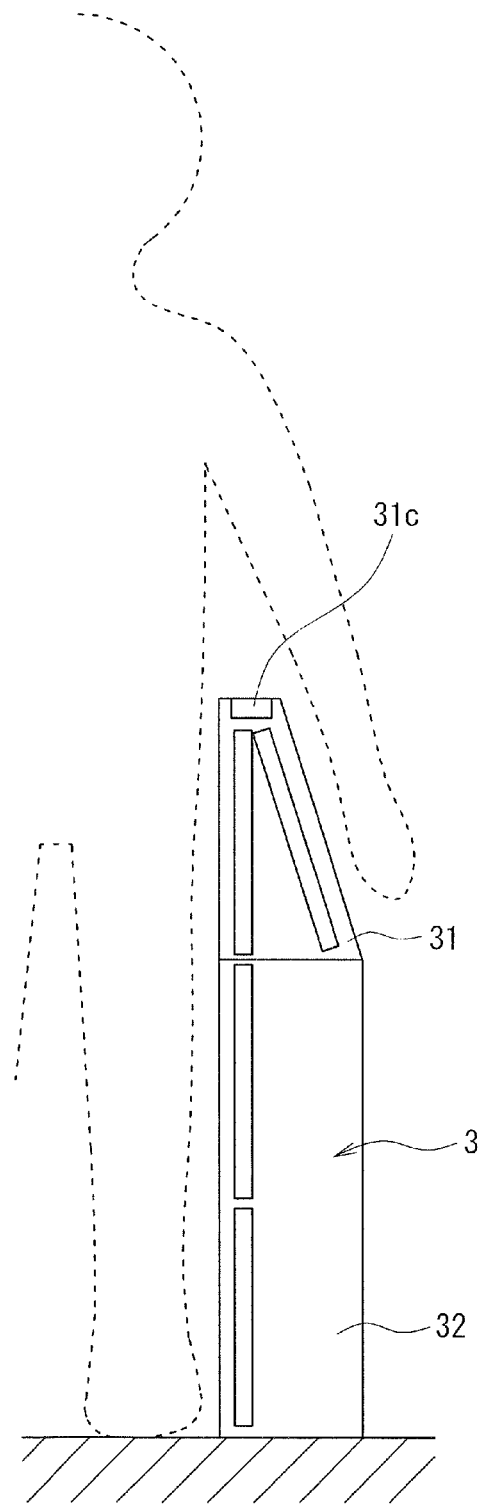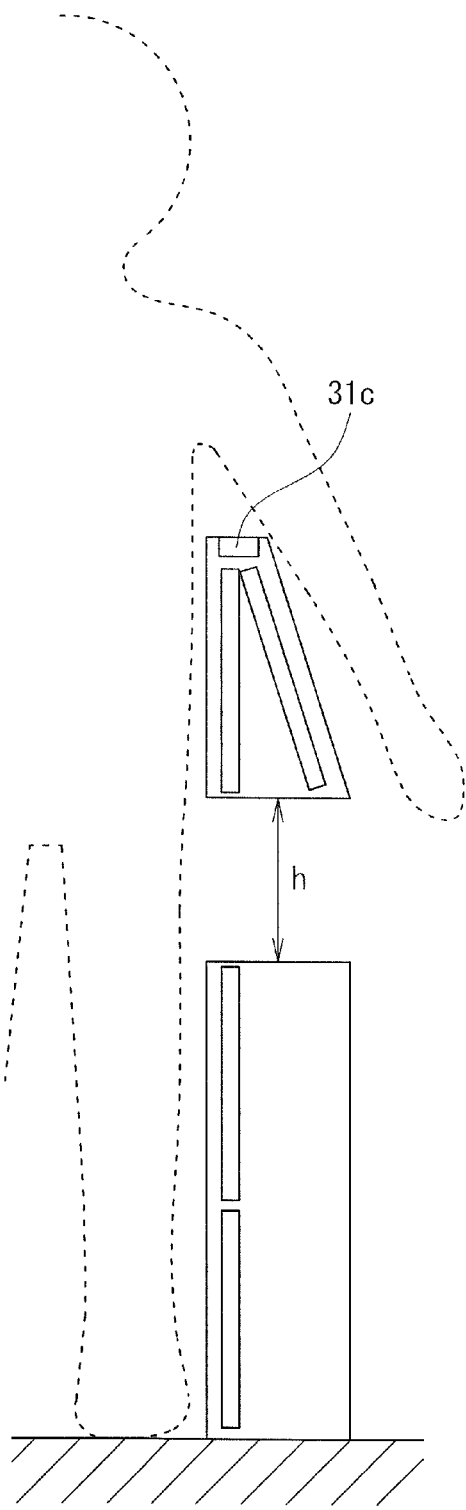

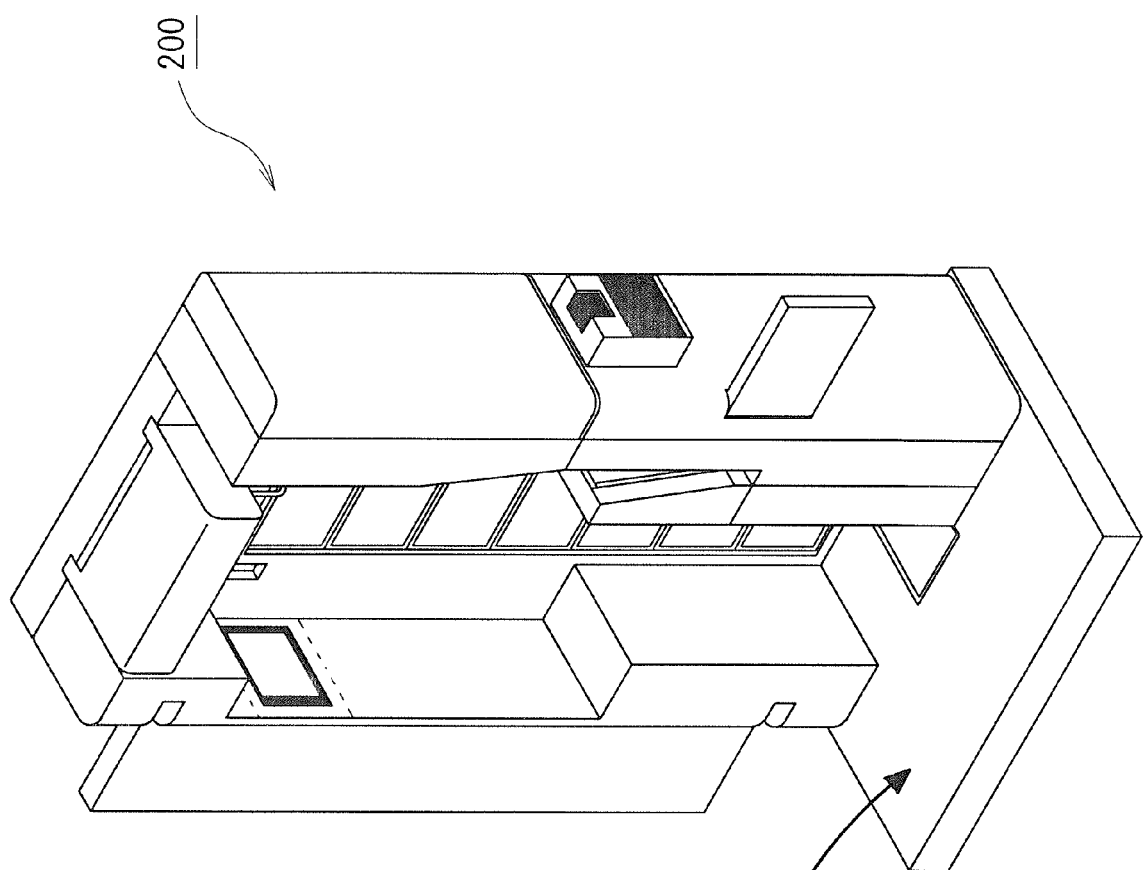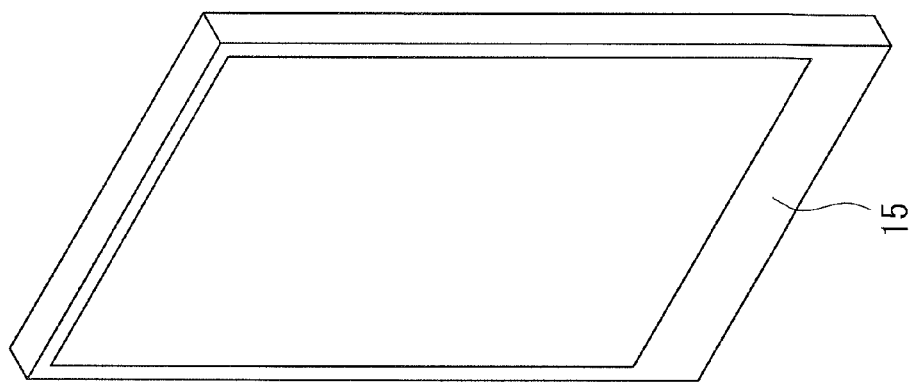
FIG.15

EXIT MONITOR

This application is the national phase of international application number PCT/JP2010/004198, filed Jun. 24, 2010, and claims the benefit of priority of Japanese application 2009-158853, filed Jul. 3, 2009. The disclosures of the international application and the Japanese priority applications are incorporated herein by reference.

BACKGROUND OF THE INVENTION

1. Field of the Invention

The present invention relates to an exit monitor that examines a contamination state of a body surface of a worker due to radioactive substances when the worker working in a controlled zone of radioactive substance handling facilities exits the controlled zone.

2. Description of the Related Art

In radioactive substance handling facilities such as a nuclear plant, in order to protect workers from radiation, a controlled zone in which an access, working conditions, and the like are controlled and managed and a non-controlled zone are designated. Workers working in the controlled zone may be contaminated with radioactive substances attached thereto. Therefore, when workers exit the controlled zone to enter the non-controlled zone, the presence of contamination of workers due to radioactive substances is examined by an exit monitor. When the exit monitor has detected that a worker is contaminated with radioactive substances, the worker removes the contamination and then gets examined through the exit monitor for the presence of contamination again. When it is confirmed that the worker is free of contamination due to radioactive substances, the worker exits to the non-controlled zone.

As a related art document related to such an exit monitor, Japanese Patent Application Laid-Open No. 11-64522 entitled Exit Monitor (FIGS. 3 and 4, hereinafter JP-A 11-64522) is known, for example. The exit monitor disclosed in this related art document has a function of adjusting a height position of a radiation detector above the head of a worker particularly in accordance with the height of the worker.

The exit monitor of JP-A 11-64522 enables detection of contamination with high accuracy since it performs measurements after detecting the height of a worker and appropriately adjusting the height position of the radiation detector above the head of the worker. However, in recent years, a further improvement in detection performance is required. For example, there is an increasing demand for more reliable detection of radioactive contamination of portions (specifically, portions near the armpit between the flank and the arm, which will be described as "armpit") where detection was considered to be difficult in the related art. However, there is no such an exit monitor at present state.

There is also a demand for simple and reliable detection of contamination due to radioactive substances including portions where detection was considered to be difficult.

Furthermore, there is a demand for an exit monitor having an inexpensive and simple structure even with an improved detection performance.

Therefore, the present invention has been made in view of the above problems, and an object thereof is to provide an exit monitor which has an inexpensive and simple structure, and which improves both detection and cost performance by enabling detection of contamination due to radioactive substances, particularly in armpit portions between the side surfaces of a human body and the arms where detection is difficult, without being affected by the different heights of a large number of workers.

SUMMARY OF THE INVENTION

To solve the problems, an exit monitor as a first aspect of the invention is an apparatus configured to examine a contamination state of a body surface due to radioactive substances, of a worker who has worked in a radiation controlled zone. The apparatus includes a front and back surface monitoring unit that detects contamination of a front or back surface of the worker using a sensor unit facing the front or back surface of the worker; a body's side surface monitoring unit that detects contamination of one side surface of the worker using the sensor unit facing one side surface of the body of the worker; and a central processing unit that performs contamination examination based on detection signals output from the respective monitoring units. The body's side surface monitoring unit includes a both side-type armpit's both side monitoring unit and a lift driving unit that moves up and down the armpit's both side monitoring unit. In the both side-type armpit's both side monitoring unit, an arm's inner side surface monitoring unit that detects contamination of an arm's inner side surface of the worker using a sensor unit facing the arm's inner side surface of the worker and a trunk's side surface monitoring unit that detects contamination of a trunk's side surface of the worker using a sensor unit facing the trunk's side surface of the worker are integrally incorporated. The central processing unit includes a lift control unit and a contamination examining unit. The lift control unit controls the lift driving unit such that the armpit's both side monitoring unit moves up when detecting contamination of the front or back surface of the worker. The contamination examining unit detects the presence of contamination of the front or back surface and the armpit's both sides based on a detection signal output by the front and back surface monitoring unit detecting a surface contamination state of the front or back surface of the body of the worker, a detection signal output by the rising trunk's side surface monitoring unit detecting a surface contamination state of the trunk's side surface ranging from the waist of the worker to the armpit, and a detection signal output by the arm's inner side surface monitoring unit detecting a surface contamination state of an arm's inner side surface ranging from the palm on the arm's inner side surface of the worker to the armpit while rising together with the trunk's side surface monitoring unit.

Moreover, as a second aspect of the invention, in the exit monitor as the first aspect of the invention, a limit sensor configured to detect an upper limit is disposed in an upper end portion of the armpit's both side monitoring unit. The central processing unit is connected to the limit sensor so as to control the lift driving unit such that the armpit's both side monitoring unit moves up continuously until a detection signal is output from the limit sensor by determining that the limit sensor is not in contact with the armpit of the worker and control the lift driving unit such that the armpit's both side monitoring unit stops rising when the limit sensor comes into contact with the armpit, and the detection signal output from the limit sensor is acquired.

Moreover, as a third aspect of the invention, the exit monitor as the first aspect of the invention further includes a hand monitoring unit that detects contamination of the back of the worker's hand using a sensor unit facing the back of the worker's hand.

Moreover, as a fourth aspect of the invention, the exit monitor as the first aspect of the invention, further includes an arm's outer side surface monitoring unit that detects contamination of an arm's outer side surface of the worker using a sensor unit facing the arm's outer side surface of the worker.

Moreover, as a fifth aspect of the invention, the exit monitor as the first aspect of the invention, further includes a head monitoring unit that detects contamination of the top of the worker's head using a sensor unit facing the top of the worker's head. Moreover, as a sixth aspect of the invention the exit monitor as the first aspect of the invention, further includes a sole monitoring unit that detects contamination of the sole of the worker's foot using a sensor unit facing the sole of the worker's foot.

Moreover, as a seventh aspect of the invention, in the exit monitor as the first aspect of the invention, each of the respective monitoring units is formed by arranging a plurality of planar sensor units. Moreover, as an eighth aspect of the invention, in the exit monitor as the seventh aspect of the invention, the central processing unit includes a single mode examination unit that performs examination in a single detector mode in which monitoring is performed based on a detection signal output from one sensor unit, and a combination mode examination unit that performs examination in a combined detector mode in which monitoring is performed based on a combined signal obtained by combining detection signal output from two adjacent sensor units.

Moreover, as a ninth aspect of the invention, in the exit monitor as the first aspect of the invention, the respective monitoring units are replaceable as a modular configuration. According to the present invention, by employing such an inexpensive and simple structure with an armpit monitoring unit being moved up rather than a structure with the number of expensive sensor units being increased, the contamination due to radioactive substances of armpit portions can be detected reliably.

Therefore, it is possible to provide an exit monitor which has an inexpensive and simple structure, and which improves both detection and cost performance by making it possible to detect contamination due to radioactive substances, particularly in armpit portions between the side surfaces of a human body and the arms where detection is difficult, without being affected by different heights of a large number of workers.

BRIEF DESCRIPTION OF DRAWINGS

FIGS. 10(a) and 10(b) show explanatory views of a lift operation of the armpit's both side monitoring unit. FIG. 10(a) shows an explanatory view of a moved down state, and FIG. 10(b) shows an explanatory view of a moved up state.

FIG. 11(a) shows an explanatory view of detection in a single detector mode, FIG. 11(b) shows an explanatory view of detection in a single detector mode, FIG. 11(c) shows a front view of detection in a combined detector mode, and FIG. 11(d) shows an explanatory view of detection in the single detector mode and the combined detector mode.

FIG. 14(a) shows a perspective external view seen from an arm's outer side surface monitoring unit side, and FIG. 14(b) shows a perspective external view seen from a gate attached display unit side.

FIG. 15 shows an explanatory view of attachment of a partition of an exit monitor.

FIG. 16(a) shows an explanatory view of a simple exit monitor, and FIG. 16(b) shows an explanatory view of a high-functional exit monitor.

DESCRIPTION OF THE PREFERRED EMBODIMENTS

Figure 1:
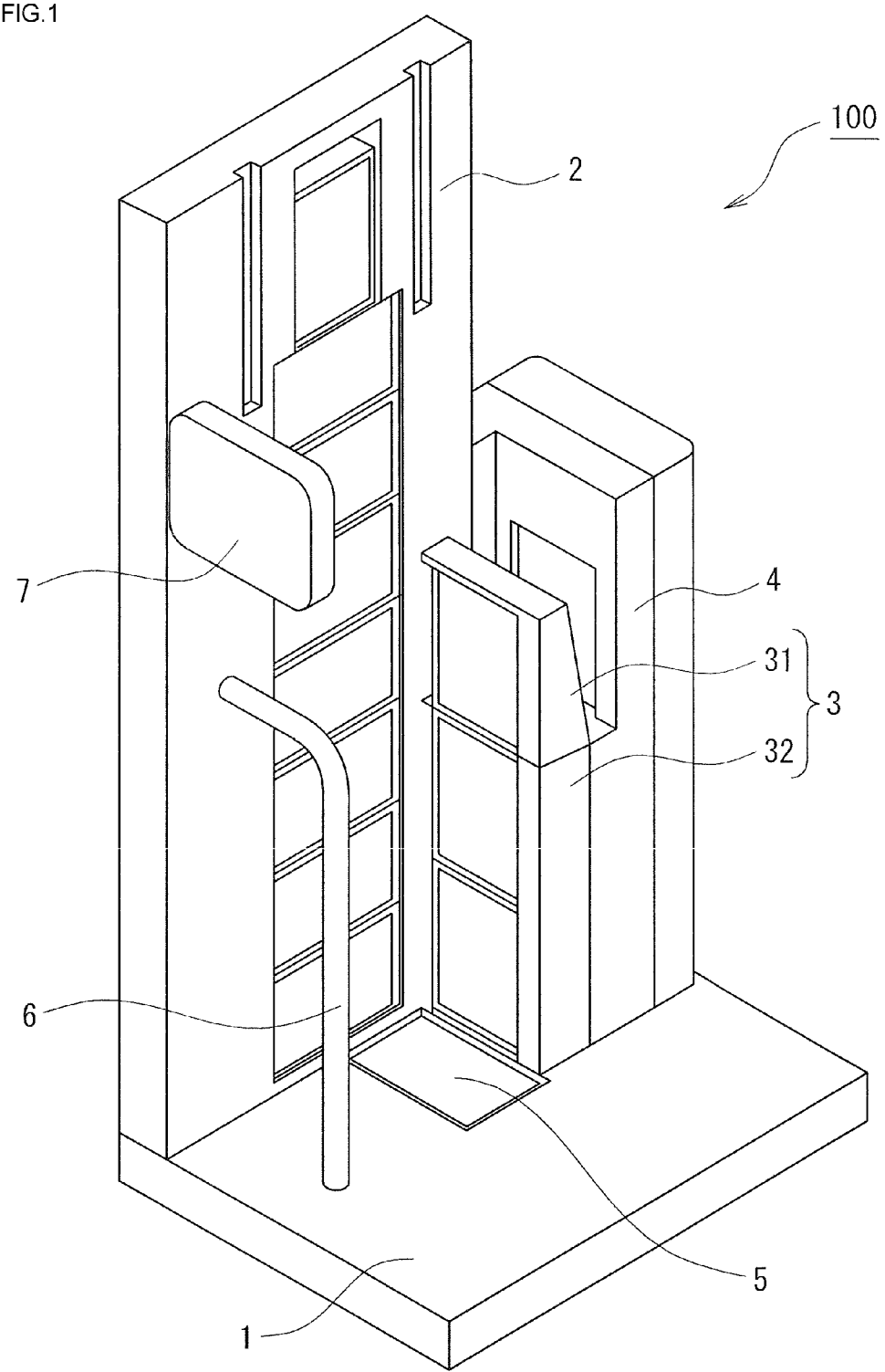
FIG. 1 shows a perspective external view of an exit monitor according to an embodiment for carrying out the present invention.

Next, embodiments of the present invention will be described with reference to the drawings. An exit monitor of the present embodiment is one which examines contamination due to radioactive substances by detecting beta rays, for example, and which will be described later. As clear from FIGS. 1 and 2, an exit monitor 100 includes a base body unit 1, a front and back surface monitoring unit 2, a body's side surface monitoring unit 3, a hand monitoring unit 4, a sole monitoring unit 5, a handrail 6, and a display unit 7.

The body's side surface monitoring unit 3 includes an armpit's both side monitoring unit 31 and an leg's side surface monitoring unit 32.

Figure 3:
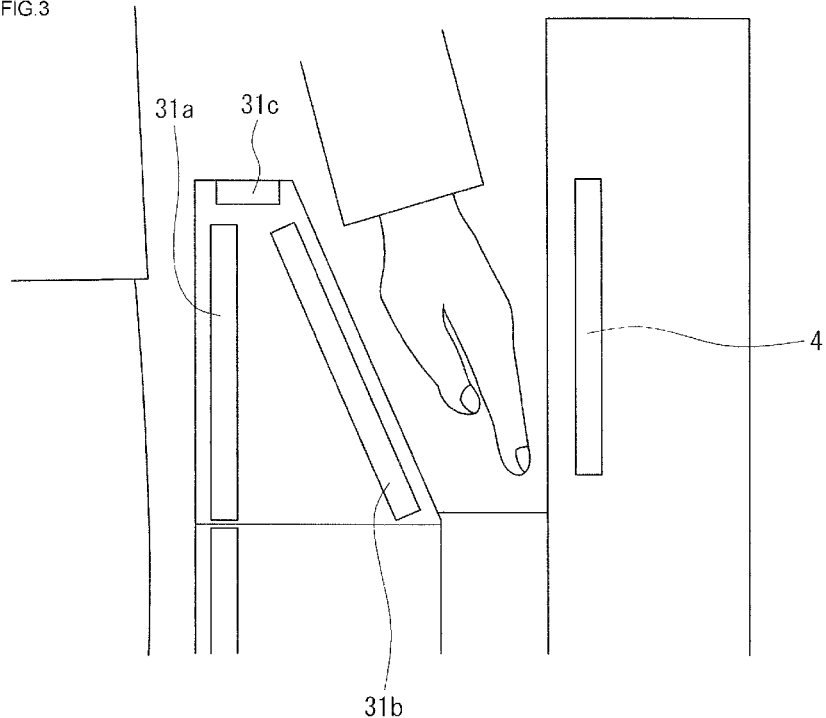
FIG. 3 shows an explanatory view of a sensor unit that monitors both sides of an arm.
Figure 4:
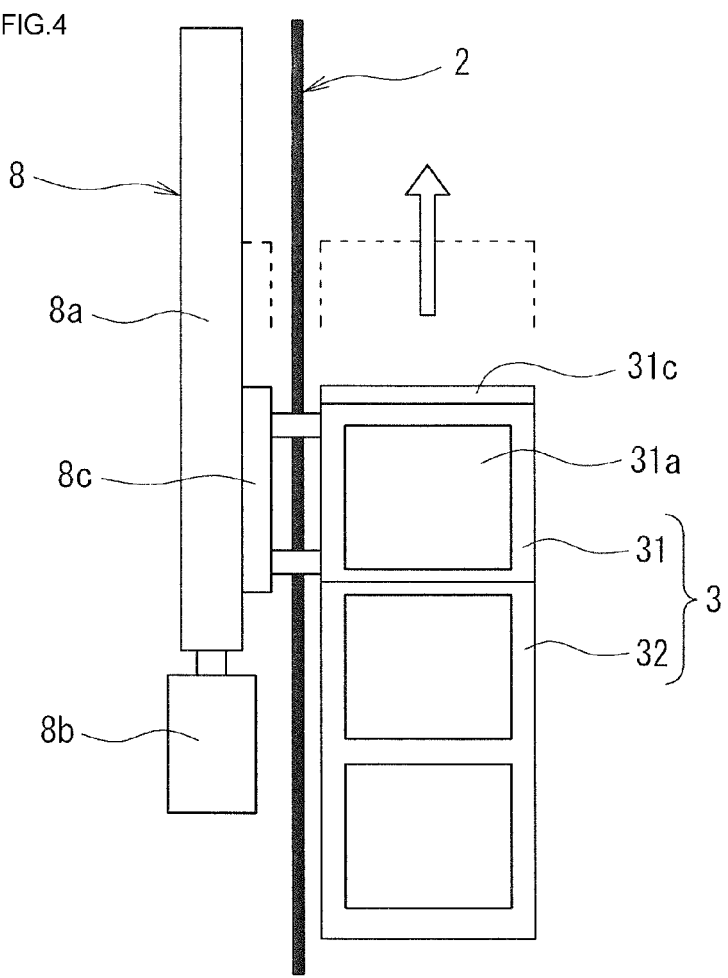
FIG. 4 shows an explanatory view of a lift driving unit.

As illustrated in FIG. 3, the armpit's both side monitoring unit 31 includes a trunk's side surface monitoring unit 31a, an arm's inner side surface monitoring unit 31b, and a limit sensor 31c. Furthermore, as illustrated in FIG. 4, the armpit's both side monitoring unit 31 includes a lift driving unit 8 that moves up and down the armpit's both side monitoring unit 31. The lift driving unit 8 includes a linear guide 8a, a motor 8b, and a moving unit 8c.

Moreover, the leg's side surface monitoring unit 32 includes two sensor units arranged in the vertical direction, and the lower end thereof is fixed to the base body unit 1.

Figure 5:
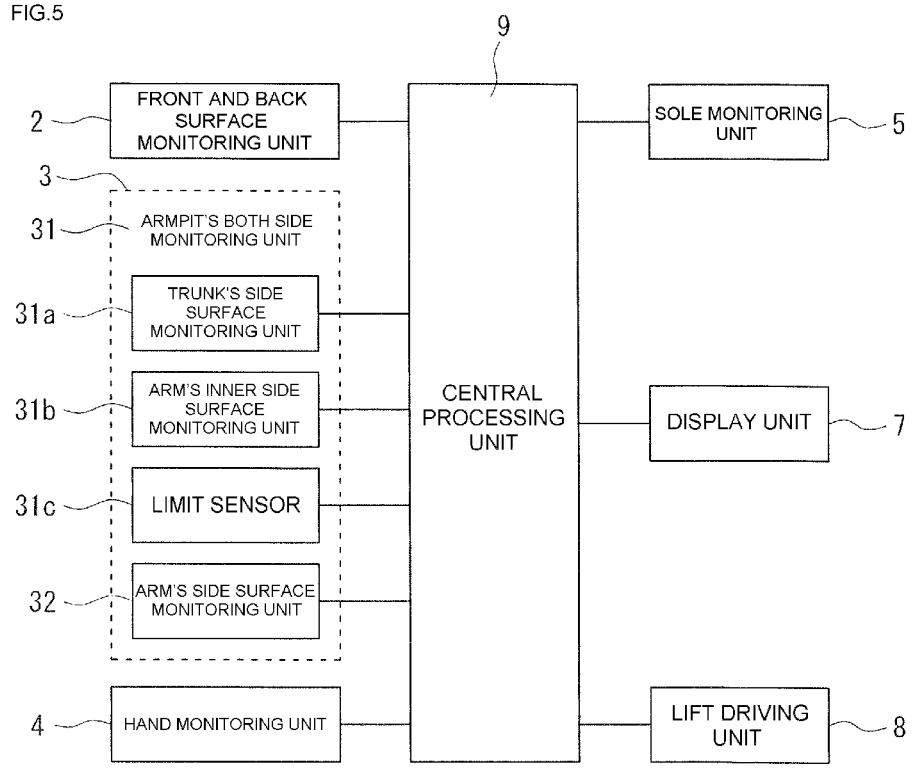
FIG. 5 shows an explanatory view of a circuit block.

Moreover, as illustrated in FIG. 5, the front and back surface monitoring unit 2, the body's side surface monitoring unit 31a, the arm's inner side surface monitoring unit 31b, the limit sensor 31c, the hand monitoring unit 4, the sole monitoring unit 5, the display unit 7, and the lift driving unit 8 are connected to the central processing unit 9. Detection signals output from the respective monitoring units are processed by the central processing unit 9. Although not illustrated, an input unit such as a switch may be connected to the central processing unit 9 so as to receive the input from a worker. An output unit such as a printer may also be connected to print the detection results and give the results to the worker.

Subsequently, the details of the respective configurations will be described.

Figure 2:
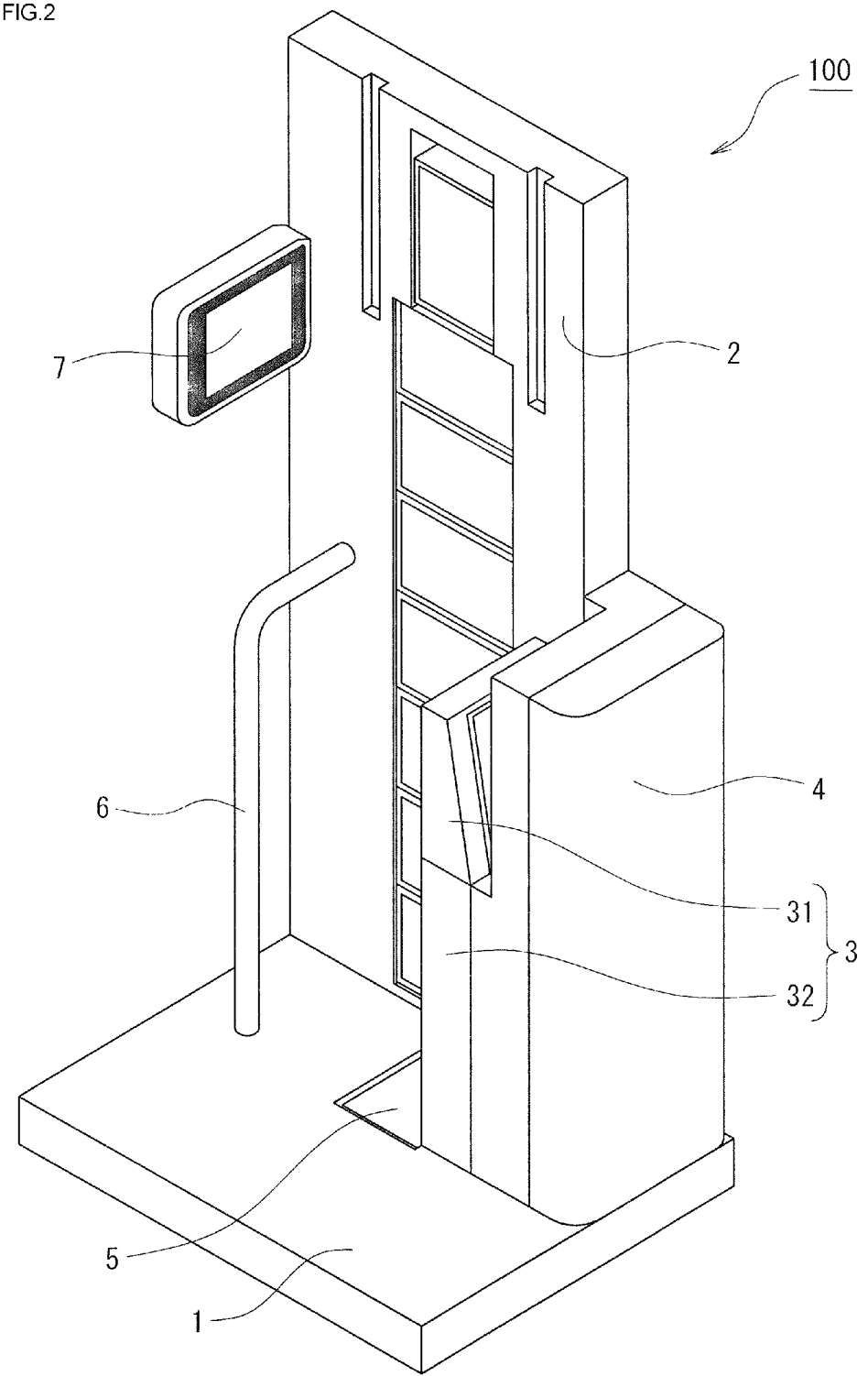
FIG. 2 shows a perspective external view of the exit monitor according to the embodiment for carrying out the present invention.

As clear from FIGS. 1 and 2, the base body unit 1 is one which has a thin box-like shape and is provided on the floor surface of a controlled zone. The base body unit 1 is configured such that respective units described later are fixed thereto, and is formed as a rigid structure because workers are loaded thereon.

Figure 6:
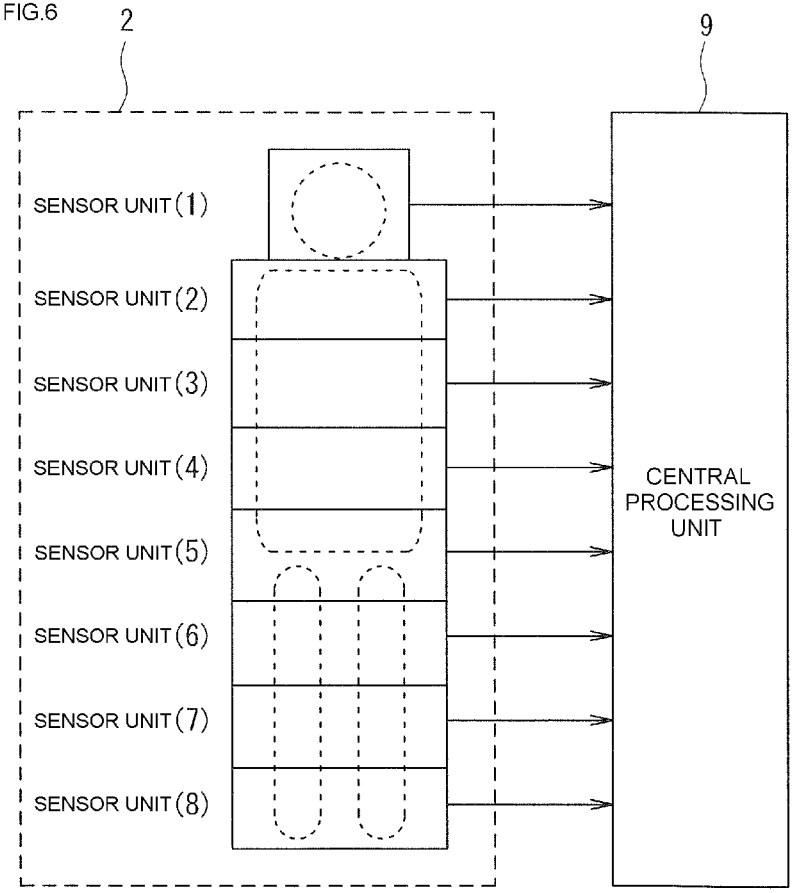
FIG. 6 shows a detailed explanatory view of a front and back surface monitoring unit.

The front and back surface monitoring unit 2 detects contamination of the front surface of a worker using a sensor unit facing the front surface of the worker. Moreover, when the worker faces the front and back surface monitoring unit 2 with the back surface thereof, the sensor unit faces the back surface of the worker, so that the sensor unit detects contamination of the back surface of the worker. That is, the front and back surface monitoring unit 2 can detect both the front and back surfaces. The distance between the sensor unit and the worker is set to a sufficiently close distance so that radioactive rays can be detected. As illustrated in FIG. 6, the front and back surface monitoring unit 2 includes sensor units (1) to (8) which are divided in a planar shape.

The sensor units are configured to include a plastic scintillator which is a beta-ray plastic scintillation detector, for example, a preamplifier, a discrete circuit, a high-voltage power supply circuit, and the like. In particular, the sensor unit (1) is one which is provided to detect contamination of the head portion of the worker, in order to cope with persons who are as tall as 2 meters, for example. The contamination of the head portions of persons who have a normal height is detected by the sensor unit (2) or (3). Thus, it is possible to detect contamination reliably regardless of a difference in height. Moreover, since the front and back surface monitoring unit 2 is formed of a plurality of divided sensor units, and the detection area of each sensor unit is decreased, it is possible to reduce the background influence and to improve detection sensitivity.

As illustrated in FIG. 3, the armpit's both side monitoring unit 31 is a both side-type monitoring unit in which a trunk's side surface monitoring unit 31a, an arm's inner side surface monitoring unit 31b, and a limit sensor 31c are integrally incorporated.

Figure 7:
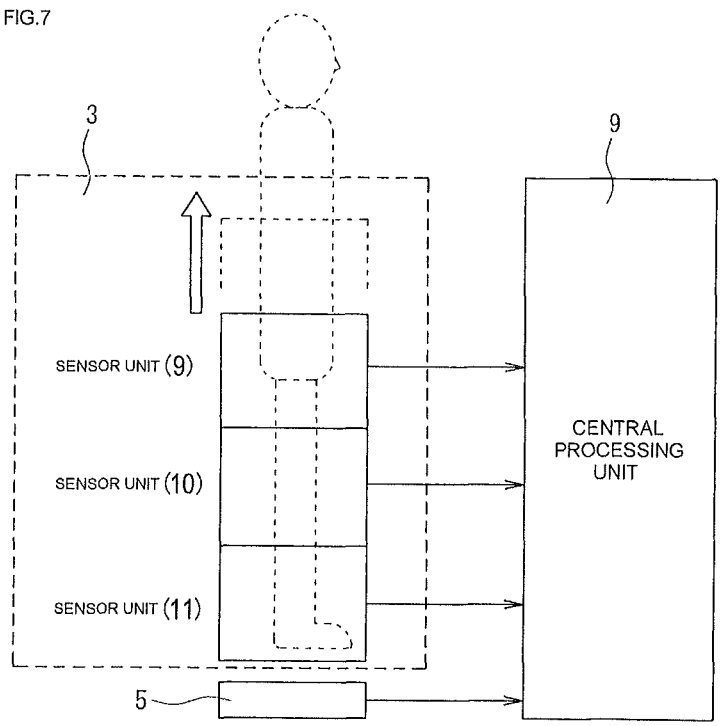
FIG. 7 shows a detailed explanatory view of a body's side surface monitoring unit.

Here, as illustrated in FIG. 7, the trunk's side surface monitoring unit 31a includes the sensor unit (9) that faces the flank or waist within one body's side surface of the worker's body.

Moreover, as illustrated in FIG. 7, the leg's side surface monitoring unit 32 includes the sensor units (10) and (11) that face the leg (thigh, calf, and ankle bone) within one body's side surface of the worker's body.

Although FIG. 7 illustrates a state in which the trunk's side surface monitoring unit 31a faces the waist and detects radioactive contamination, the trunk's side surface monitoring unit 31a moves up while being separated from the leg's side surface monitoring unit 32 to face a body's side surface ranging from the waist to the armpit (chest's side surface or the like) and detect radioactive contamination.

When the worker faces the trunk's side surface monitoring unit 31a with the back or front surface thereof, the trunk's side surface monitoring unit 31a detects radioactive contamination of both side surfaces of the worker's body.

Since the body's side surface monitoring unit 3 is formed of a plurality of sensor units (9) to (11) divided in a planar shape as described above, and the detection area of each sensor unit is decreased, it is possible to reduce the background influence and to improve detection sensitivity.

Figure 8:
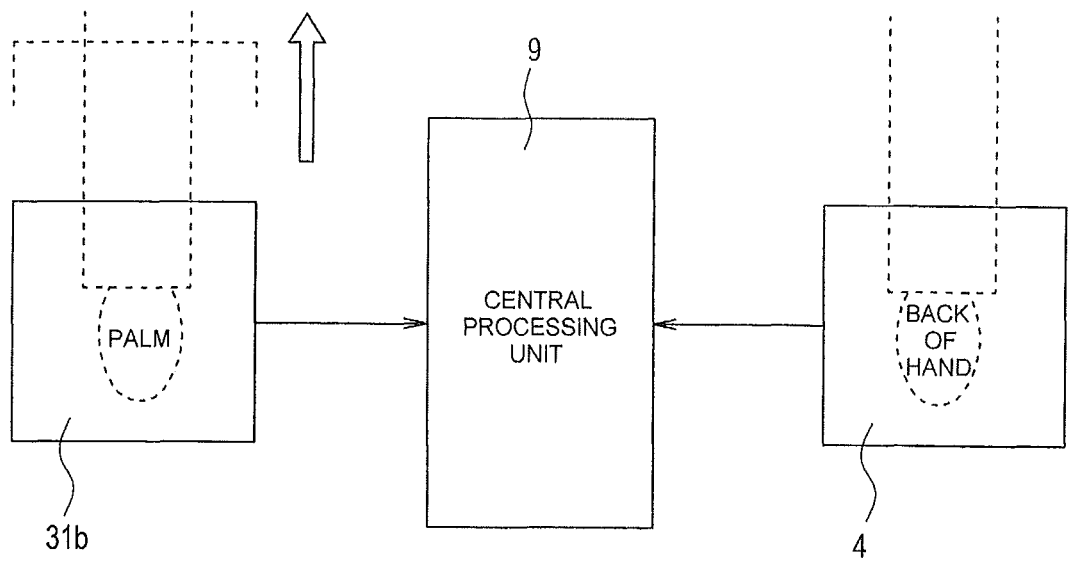
FIG. 8 shows a detailed explanatory view of an arm's inner side surface monitoring unit and a hand monitoring unit.

As illustrated in FIGS. 3 and 8, the arm's inner side surface monitoring unit 31b is a monitoring unit that detects contamination of an arm's inner side surface of the worker using a sensor unit facing the arm's inner side surface of the worker. In FIGS. 3 and 8, although the arm's inner side surface monitoring unit 31b faces the palm of the worker to detect contamination due to radioactive substances, of the palm, the arm's inner side surface monitoring unit 31b moves up to face the arm's inner side surface (the inner side of an arm and the inner sides of two arms).

The limit sensor 31c has a function of outputting a detection signal when the armpit's both side monitoring unit 31 reaches a predetermined upper limit (specifically, a portion near the armpit of the worker). The limit sensor 31c is a contact sensor, a limit switch, or the like, for example.

As illustrated in FIGS. 3 and 8, the hand monitoring unit 4 faces the back of the worker's hand and detects contamination due to radioactive substances, of the back of the hand. The arm's inner side surface monitoring unit 31b described above, the hand monitoring unit 4, and the bottom surface bridging these two units 31b and 4 collectively form a concave portion, and the worker measures contamination in a state where one hand thereof is inserted into the concave portion.

As illustrated in FIGS. 1, 2, and 7, the sole monitoring unit 5 faces the bottom of a worker's foot and detects contamination due to radioactive substances, of the bottom of the foot. When the front surface of the worker faces the front and back surface monitoring unit 2, the sole monitoring unit 5 loads the rear surface of one foot thereof. Moreover, when the back surface of the worker faces the front and back surface monitoring unit 2, the sole monitoring unit 5 loads the rear surface of the other foot. In this way, it is possible to examine the sole surfaces of both feet.

The handrail 6 is provided for the worker to hold thereon. Moreover, the handrail 6 functions to guide the worker to stand at a predetermined position and also functions as a reinforcing member that supports the front and back surface monitoring unit 2 with respect to the base body unit 1.

The display unit 7 displays guidance for detection method, detection results, and the like.

As illustrated in FIG. 4, the lift driving unit 8 is configured such that when the motor 8b rotates, the moving unit (slider) 8c of the linear guide 8a moves in the vertical direction by a ball screw. As a result, the lift driving unit 8 moves up and down the armpit's both side monitoring unit 31 which is mechanically fixed to the moving unit 8c. Upon receiving a drive control signal from the central processing unit 9, a driver (not illustrated) drives the motor 8b so as to rotate in a forward or backward direction.

Figure 9:
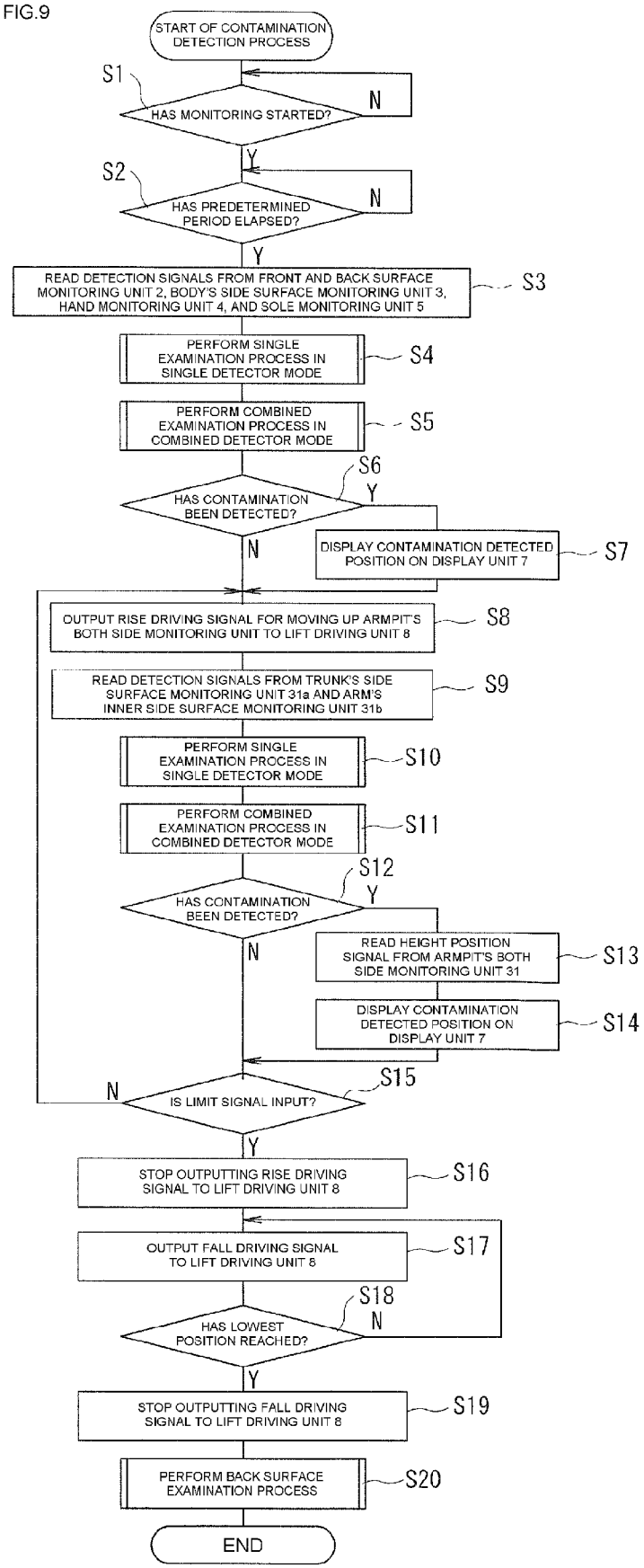
FIG. 9 shows a flowchart illustrating an example of the flow of a contamination detecting process executed by a central processing unit.

The central processing unit 9 is configured to include an arithmetic processing device such as a microcomputer, for example, and a storage unit storing a contamination detection program, and executes a contamination detection process illustrated in FIG. 9.

The contamination detection process starts from step S1, in which a human detecting sensor (not illustrated) determines whether a monitoring start state has begun by detecting a worker entering into the exit monitor 100. When the monitoring start state has not begun, a standby is performed until the monitoring start state begins. The flow proceeds to step S2 when the monitoring start state has begun.

In step S2, it is determined whether a predetermined period (counting period) required for the respective monitoring units to be able to detect radioactive rays has elapsed. When the predetermined period has not elapsed, a standby is performed until the predetermined period elapses. When the predetermined period has elapsed, the flow proceeds to step S3.

In step S3, the detection signals obtained by the front and back surface monitoring unit 2, the body's side surface monitoring unit 3, the hand monitoring unit 4, and the sole monitoring unit 5 are read. Subsequently, the flow proceeds to step S4 to perform a single examination process in a single detector mode described later, and then the flow proceeds to step S5.

In step S5, a combined examination process in a combined detector mode described later is performed, and then the flow proceeds to step S6. In step S6, it is determined whether radioactive contamination has been detected by the single examination process and the combined examination process. When contamination has been detected, the flow proceeds to step S7 to display a contamination detected position on the display unit 7, and then the flow proceeds to step S8. When contamination has not been detected, the flow proceeds directly to step S8.

In step S8, a rise driving signal for moving up the armpit's both side monitoring unit 31 is output to the lift driving unit 8. Subsequently, the flow proceeds to step S9, and the detection signals obtained by the trunk's side surface monitoring unit 31a and the arm's inner side surface monitoring unit 31b are read.

Subsequently, the flow proceeds to step S10, and the same single examination process as step S4 is performed based on the detection signals obtained by the trunk's side surface monitoring unit 31a and the arm's inner side surface monitoring unit 31b Subsequently, the flow proceeds to step S11, and the same combined examination process as step S5 is performed based on the detection signal obtained by the sensor of the trunk's side surface monitoring unit 31a and the detection signals obtained by the respective sensors of the front and back surface monitoring unit 2.

Subsequently, the flow proceeds to step S12, and it is determined whether contamination due to radioactive substances has been detected by the single examination process and the combined examination process. When contamination has been detected, the flow proceeds to step S13, and a height position signal obtained by the armpit's both side monitoring unit 31 is read. Then, the flow proceeds to step S14, a contamination detected position is identified based on the height position signal obtained by the armpit's both side monitoring unit 31 and displayed on the display unit 7. Then, the flow proceeds to step S15.

Moreover, when it is determined in step S12 that no contamination due to radioactive substances has been detected, the flow proceeds directly to step S15.

In step S15, it is determined whether a limit signal is input from the limit sensor 3c. When the limit signal is not input, it is determined that the armpit's both side monitoring unit 31 has not reached the upper limit position, and the flow returns to step S8. When the limit signal is input, it is determined that the armpit's both side monitoring unit 31 has reached the upper limit position, and the flow proceeds to step S16.

In step S16, the output of a rise driving signal to the lift driving unit 8 is stopped. Then, the flow proceeds to step S17, and a fall driving signal is output to the lift driving unit 8. Then, the flow proceeds to step S18.

In step S18, it is determined whether the lower surface of the armpit's both side monitoring unit 31 has reached the lowest position where it contacts the upper surface of the leg's side surface monitoring unit 32. When the lower surface has not reached the lowest position, the flow returns to step S17. When the lower surface has reached the lowest position, the flow proceeds to step S19, and the output of a fall driving signal to the lift driving unit 8 is stopped. In this case, a message for informing the worker of the end of examination of the front surface is displayed on the display unit 7. Moreover, when the worker turns the body so that the back thereof faces the front and back surface monitoring unit 2, the flow proceeds to step S20 to perform a back surface examination process in which the same processes as steps S1 to S19 with respect to the back surface of the worker are performed. Then, the contamination detection process ends.

In the process of FIG. 9, the processes of steps S3 to S7 and the processes of steps S9 to S14 correspond to a "contamination examining unit," the processes of steps S8 and S15 to S18 correspond to "lift control unit," the processes of steps S4 and S10 correspond to a "single mode examination unit," and the processes of steps S5 and S11 correspond to a "combination mode examination unit."

Subsequently, detection of contamination due to radioactive substance by the exit monitor 100 of the present invention will be described in detail.

When the entrance of a worker into the exit monitor 100 is detected by a human detecting sensor (not illustrated), for example, the exit monitor 100 enters the ON state. The worker may operate a switch (not illustrated) to activate the exit monitor 100. First, the present background value (BG value) before contamination is detected is measured. Subsequently, the worker stands on at a monitoring position. In this case, as illustrated in FIGS. 6 and 7, the worker steps on the sole monitoring unit 5 so that the front surface of the worker contacts the front and back surface monitoring unit 2, and the right side surface of the worker contacts the body's side surface monitoring unit 3. Moreover, as illustrated in FIG. 3, the worker inserts one hand thereof into the concave portion so that the palm thereof contacts the arm's inner side surface monitoring unit 3b, and the back of the hand contacts the hand monitoring unit 4.

Moreover, monitoring of contamination due to radioactive substances starts in response to the input from a switch (not illustrated), for example. The central processing unit 9 receives detection signals from the front and back surface monitoring unit 2, the armpit's both side monitoring unit 31 (the trunk's side surface monitoring unit 31a and the arm's inner side surface monitoring unit 31b), the leg's side surface monitoring unit 32, the hand monitoring unit 4, and the sole monitoring unit 5.

Upon receiving these detection signals, the central processing unit 9 controls the lift driving unit 8 so that the armpit's both side monitoring unit 31 moves up. The armpit's both side monitoring unit 31 which was at an initial position as illustrated in FIG. 10(a) at the examination start time starts moving up.

The central processing unit 9 performs detection of contamination due to radioactive substances based on these detection signals.

First, the central processing unit 9 functions as a single mode examination unit that performs monitoring in a single detector mode based on the detection signal output from one sensor unit.

The central processing unit 9 compares the latest BG value registered in a storage unit (not illustrated) with the detection signal. When the detection signal is as small as the BG value, it is determined that there is no contamination due to radioactive substances. When the detection signal is larger than the BG value, it is determined that there is contamination due to radioactive substances. The central processing unit 9 displays the detection results on the display unit 7. Moreover, the central processing unit 9 reads the latest BG count rate (the moving average value of the BG count rate corresponding to the number of times of BG measurement set in advance) registered in the storage unit and subtracts a BG count rate during surface contamination measurement from the latest BG count rate to thereby calculate a net count rate. These net count rates are also displayed on the display unit 7.

Figure 11A:
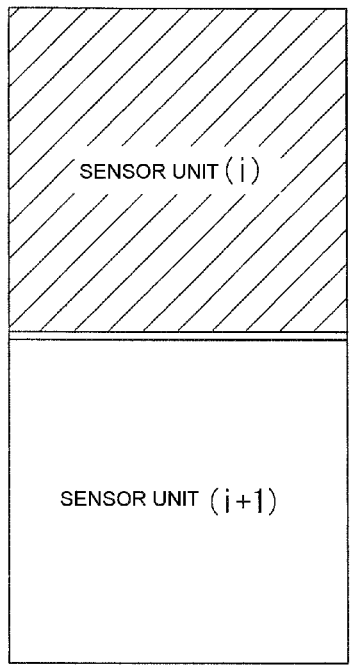
FIGS. 11(a) to 11(d) show explanatory views of detection.
Figure 11B:
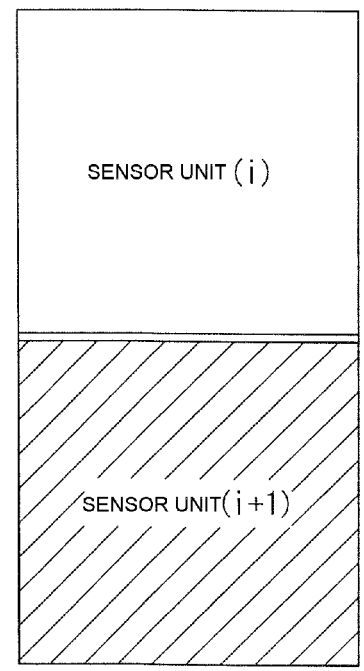
Figure 11C:
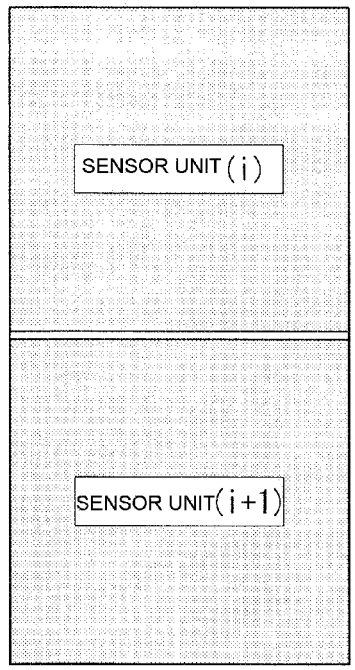
Figure 11D:
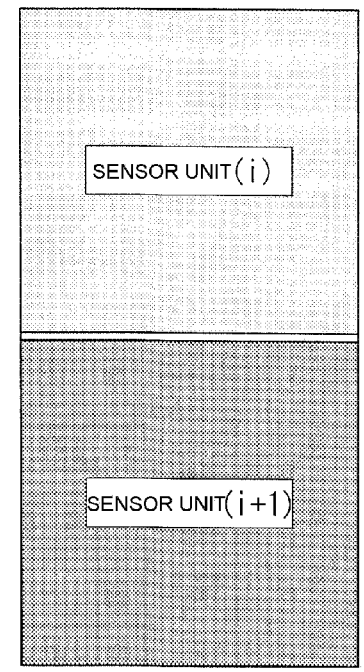

In such a single detector mode, for example, as illustrated in FIG. 11(a), when the detection signal of a sensor unit (i) is larger than the BG value or the detection signal of a sensor unit (i+1), it is detected that a portion facing the sensor unit (i) is contaminated with radioactive substances. In this case, it is determined that a predetermined range near the center of the sensor unit (i) is contaminated with radioactive substances. In a combined detector mode described later, since the BG value is doubled, it is possible to detect contamination with low contamination density although the sensitivity is sacrificed. The detected portion is displayed on the display unit 7.

Moreover, as illustrated in FIG. 11(*b*), when the detection signal of the sensor unit (i+1) is larger than the BG value or the detection signal of the sensor unit (i), it is detected that a portion facing the sensor unit (i+1) is contaminated with radioactive substances. The detected portion is displayed on the display unit 7.

In addition to the display, the central processing unit 9 also displays the contamination detected positions due to radioactive substances on the display unit 7. For example, when the data of a human image is read from a storage unit (not illustrated), the human image is displayed, and the portions corresponding to the contamination detected positions due to radioactive substances are flashed on and off, the worker can immediately understand the contaminated positions.

When contamination due to radioactive substances was detected based on the detection signals from the front and back surface monitoring unit 2, the hand monitoring unit 4, and the sole monitoring unit 5, the detected positions can be easily identified from the positions of the sensor units.

However, since the armpit's both side monitoring unit 31 including the trunk's side surface monitoring unit 31*a* and the arm's inner side surface monitoring unit 31*b* detects contamination while gradually moving up, identification of contaminated positions due to radioactive substances requires special measures. For example, as illustrated in FIG. 10(*a*), when a state in which the armpit's both side monitoring unit 31 is at the lowest position, and the lower surface thereof is in contact with the upper surface of the leg's side surface monitoring unit 32 is considered as a position of 0, by adding the rise amount h of the armpit's both side monitoring unit 31 and the height of the entire monitoring unit as illustrated in FIG. 10(*b*), it is possible to identify the approximate position of a person. The identified position is displayed on the display unit 7. The rise amount h may be measured based on a distance sensor, for example, and may be calculated by counting a pulse signal from an encoder (not illustrated) attached to the motor 8*b* of the lift driving unit and calculating the same as a moving amount based on the count value.

Moreover, the central processing unit 9 functions as a combination mode examination unit that performs monitoring in a combined detector mode based on the detection signals output from two adjacent sensor units. The detection in the combined detector mode is performed at the same time as the detection in the single detector mode described above.

In the single detector mode described above, when a radiation source is near the boundary between two sensor units, since radioactive substances radiate in a manner of being distributed to two sensor units, the radioactive substances are embedded in the BG value, and therefore high-accuracy detection is not easy. Therefore, radioactive substances are detected by a combination mode examination unit that performs monitoring in a combined detector mode based on a combined signal obtained by combining the detection signals output from two adjacent sensor units, and the detection accuracy is increased.

For example, in the combined detector mode, as illustrated in FIG. 11(*c*), when the detection signal of the sensor unit (i) is substantially the same as the detection signal of the sensor unit (i+1) but is larger than the BG value, it is detected that a position at the boundary between the sensor unit (i) and the sensor unit (i+1) is contaminated with radioactive substances. The combined detector mode is advantageous in detecting contamination due to radioactive substances at such a boundary position.

Moreover, as illustrated in FIG. 11(*d*), when the detection signal of the sensor unit (i+1) is larger than the detection signal of the sensor unit (i) and both are larger than the BG value, it is detected that a position at the boundary between the sensor unit (i) and the sensor unit (i+1) is contaminated with radioactive substances, and a surface facing the sensor unit (i+1) is also contaminated with radioactive substances. By using both the single mode and the combined mode in such a way, high-accuracy detection including identification of contaminated portions with respect to contamination due to radioactive substances, of a plurality of portions is possible.

The combined detector mode is applied between the adjacent sensor units of the front and back surface monitoring unit 2, between the adjacent sensor units of the body's side surface monitoring unit 3, and between the adjacent sensor units of the front and back surface monitoring unit 2 and the body's side surface monitoring unit 3.

When the central processing unit 9 has detected contamination due to radioactive substances based on the detection signals from the front and back surface monitoring unit 2, the body's side surface monitoring unit 3, the hand monitoring unit 4, and the sole monitoring unit 5, the detected positions are easily identified from the positions of the sensor units.

Since monitoring is performed by using both the single detector mode and the combined detector mode in such a way, it is possible to detect the contaminated position due to radioactive substances including the boundary position between two sensor units and to increase detection performance.

When the detection progresses, and as illustrated in FIG. 10(*b*), the upper limit signal is output when the limit sensor 31*c* of the armpit's both side monitoring unit 31 has reached the upper limit near the armpit of the worker, the central processing unit 9 ends detection. During the period in which the armpit's both side monitoring unit 31 moves up, the trunk's side surface monitoring unit 31*a* monitors the surface contamination state of the body's side surface ranging from the waist of the worker to the armpit, and the arm's inner side surface monitoring unit 31*b* monitors the surface contamination state of the arm's inner side surface ranging from the palm on the arm's inner side of the worker to the armpit. In this way, the examination ends.

As described above, the body's side surface monitoring unit 3 including the armpit's both side monitoring unit 31 and the leg's side surface monitoring unit 32 detects the surface contamination state of the body's side surface ranging from the foot of the worker to the armpit through monitoring and outputs a detection signal. In this way, detection of contamination due to radioactive substances of the armpit's both sides where detection was difficult in the related art can be made, and detection performance is improved. Moreover, by employing the relatively inexpensive lift driving unit 8 while decreasing the number of expensive sensor units, a cost reduction is realized. Furthermore, the lift period is relatively short, and the worker may not become impatient.

In this way, the front surface is monitored. When monitoring of the front surface ends, the central processing unit 9 outputs a drive control signal for moving down the armpit's both side monitoring unit 31 to the lift driving unit 8 to move down the armpit's both side monitoring unit 31 so that the bottom surface thereof returns to the lowest position where it contacts the upper surface of the leg's side surface monitoring unit 32. Subsequently, the worker turns the body so that the back thereof faces the front and back surface monitoring unit 2, and the same monitoring is performed. In this way, it is possible to examine all surfaces of the front, back, left, and right surfaces and the left and right soles.

When the examination result indicates "Normal," a message indicating that the worker is allowed to exit is displayed on the display unit 7, the worker exits from the exit monitor 100, and the examination ends.

However, when the examination result indicates "Contamination," a warning sound is output, a contaminated portion and the degree of contamination are displayed on a switch or the display unit 7 and are printed out as necessary. The worker exits from the entrance and washes a contaminated portion and gets examination again by the exit monitor 100. In this way, when an examination result indicating "Normal" is obtained, the worker is allowed to exit from the exit monitor 100.

The exit monitor 100 of the present embodiment has such a configuration.

Subsequently, another embodiment of the present invention will be described with reference to the drawings. With reference to FIGS. 12-16(b), an exit monitor 200 of the present embodiment is one which examines contamination due to radioactive substances by detecting beta rays, for example, and which will be described later. As clear from FIGS. 12 and 13, the exit monitor 200 includes a base body unit 1, a front and back surface monitoring unit 2, a body's side surface monitoring unit 3 including an armpit's both side monitoring unit 31 and an leg's side surface monitoring unit 32, a sole monitoring unit 5, a handrail 6, a gate attached hand monitoring unit 10, a gate attached arm's outer side surface monitoring unit 11, a dosimeter reader 12, a gate attached display unit 13, and a head monitoring unit 14.

Any one of the gate attached hand monitoring unit 10 and the gate attached arm's outer side surface monitoring unit 11 is selectively included. Moreover, any one of the handrail 6 and the display unit 7, and the gate attached display unit 13 is selectively included. Here, the front and back surface monitoring unit 2, the armpit's both side monitoring unit 31, the leg's side surface monitoring unit 32, the sole monitoring unit 5, and the handrail 6 have the same configuration as described above, redundant description thereof will not be provided, and the difference will be described mainly.

Figure 12:
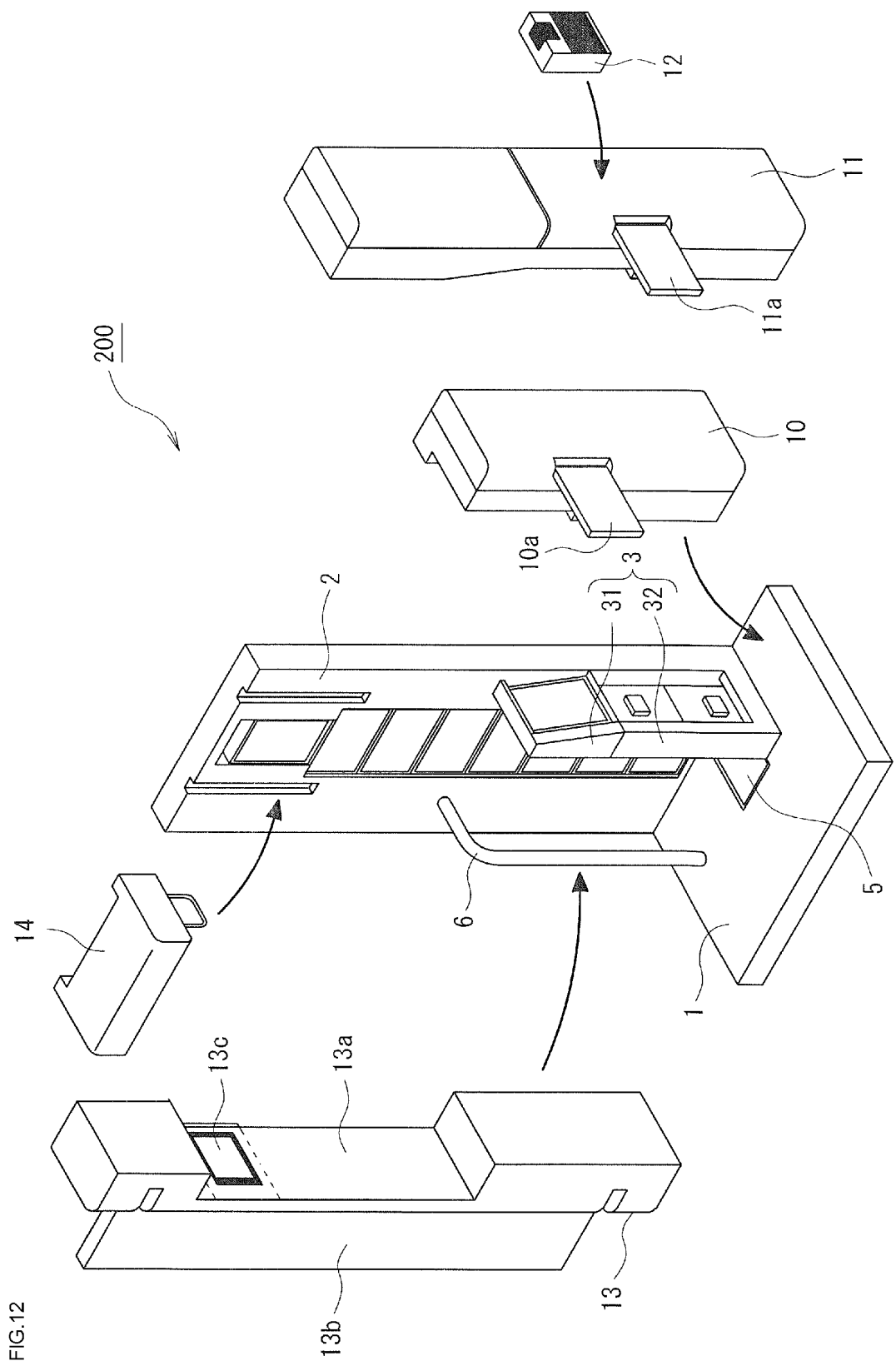
FIG. 12 shows an explanatory view of replacement of monitoring units of an exit monitor.
Figure 13:
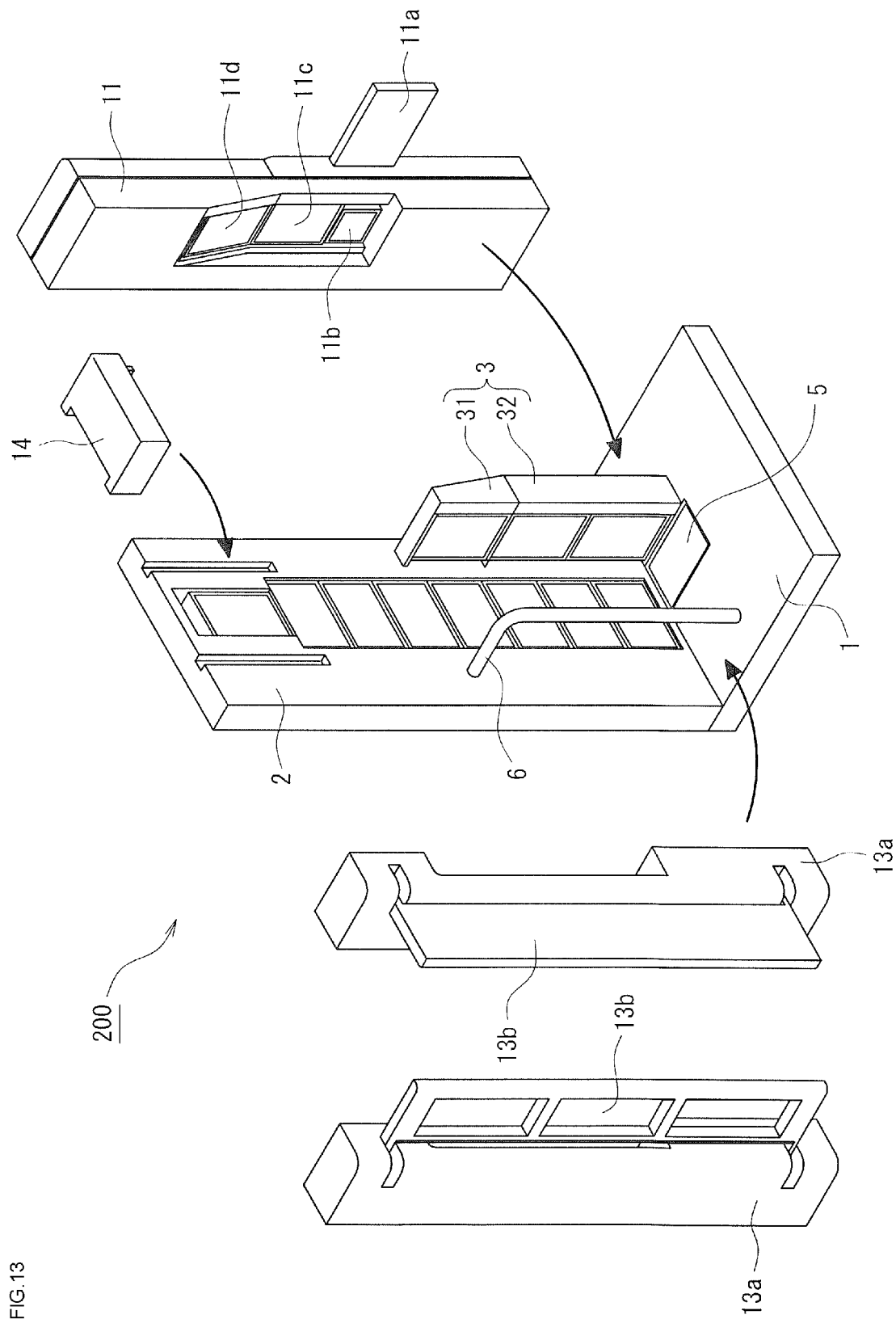
FIG. 13 shows an explanatory view of replacement of monitoring units of an exit monitor.

As illustrated in FIGS. 12 and 13, the gate attached hand monitoring unit 10 includes a gate 10a. The gate attached hand monitoring unit 10 has a configuration in which the gate 10a is added to the hand monitoring unit 4 described above. The gate 10a is opened and closed by an opening and closing drive unit (not illustrated). The opening and closing drive unit is connected to and controlled by the central processing unit 9.

As illustrated in FIG. 13, the gate attached arm's outer side surface monitoring unit 11 includes a gate 11a, a hand sensor unit 11b, an arm sensor unit 11c, and a forearm sensor unit 11d. The gate 11a is also opened and closed by an opening and closing drive unit (not illustrated). The opening and closing drive unit is connected to and controlled by the central processing unit 9. Moreover, the hand sensor unit 11b, the arm sensor unit 11c, and the forearm sensor unit 11d are also connected to the central processing unit 9, and detection signals are acquired. Moreover, the combined mode is also applied between the hand sensor unit 11b, the arm sensor unit 11c, and the forearm sensor unit 11d, and when a radiation source is positioned between these sensor units, contamination due to radioactive substances is detected. In the present embodiment, it will be described that the gate attached arm's outer side surface monitoring unit 11 is selected and disposed.

As illustrated in FIG. 12, the dosimeter reader 12 is one which reads data from a dosimeter (not illustrated) handheld by the worker. In the dosimeter, personal identification information (ID) of the worker and data such as a radiation dose due to work in the controlled zone are stored. When a dosimeter is attached to the dosimeter reader 12 disposed at a predetermined position of the gate attached arm's outer side surface monitoring unit 11 illustrated in FIG. 12, the data of the dosimeter are read, and a zone exiting process starts. Moreover, a standby state begins so that the exit monitor 200 starts detection.

As illustrated in FIG. 14, the gate attached display unit 13 includes a body unit 13a, a gate 13b, and a display unit 13c. The gate attached display unit 13 has a configuration in which the gate 13b is added to the body unit 13a, and the same display unit 13c as the display unit 7 described above is incorporated into the large-size body unit 13a. The gate 13b is also opened and closed by an opening and closing drive unit (not illustrated). The opening and closing drive unit is connected to and controlled by the central processing unit 9.

As illustrated in FIGS. 12 and 13, the head monitoring unit 14 moves down while measuring the position from the head monitoring unit 14 to the head portion of the worker using a sensor unit (not illustrated) and stops at the optimum position, namely a position where radiation of the head is detected. Moreover, the contamination state of the worker at the optimum position is detected. The head monitoring unit 14 is also moved up and down by a lift driving unit (not illustrated). The lift driving unit is connected to and controlled by the central processing unit 9.

Figure 14B:
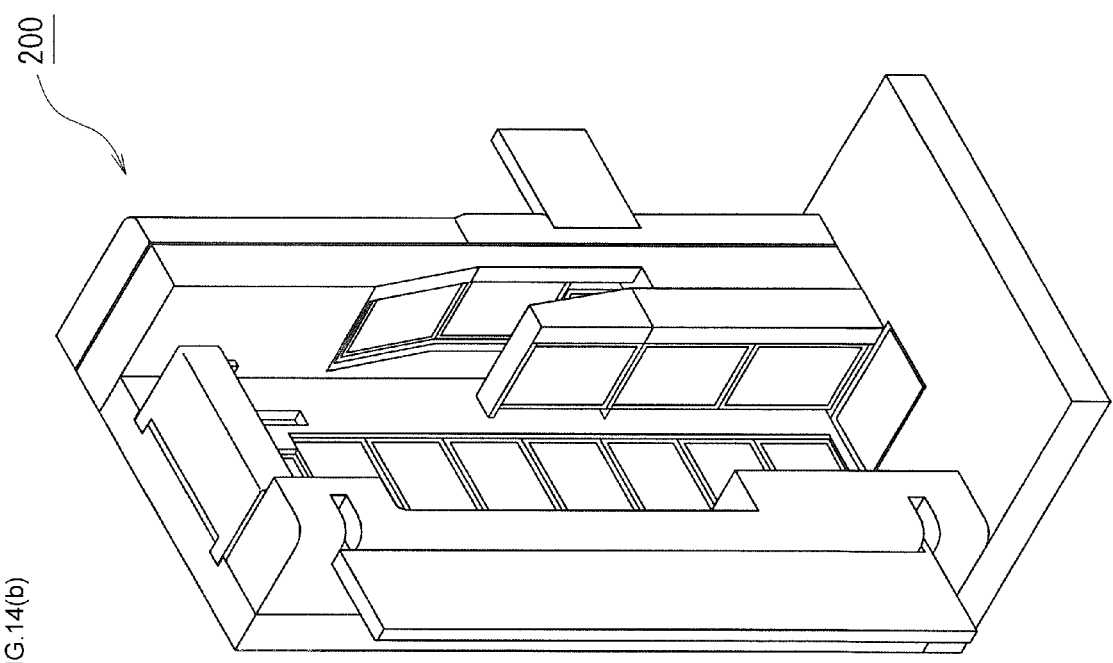
FIGS. 14(a) and 14(b) show perspective external views of an exit monitor in which monitoring units are replaced according to another embodiment.
Figure 14A:
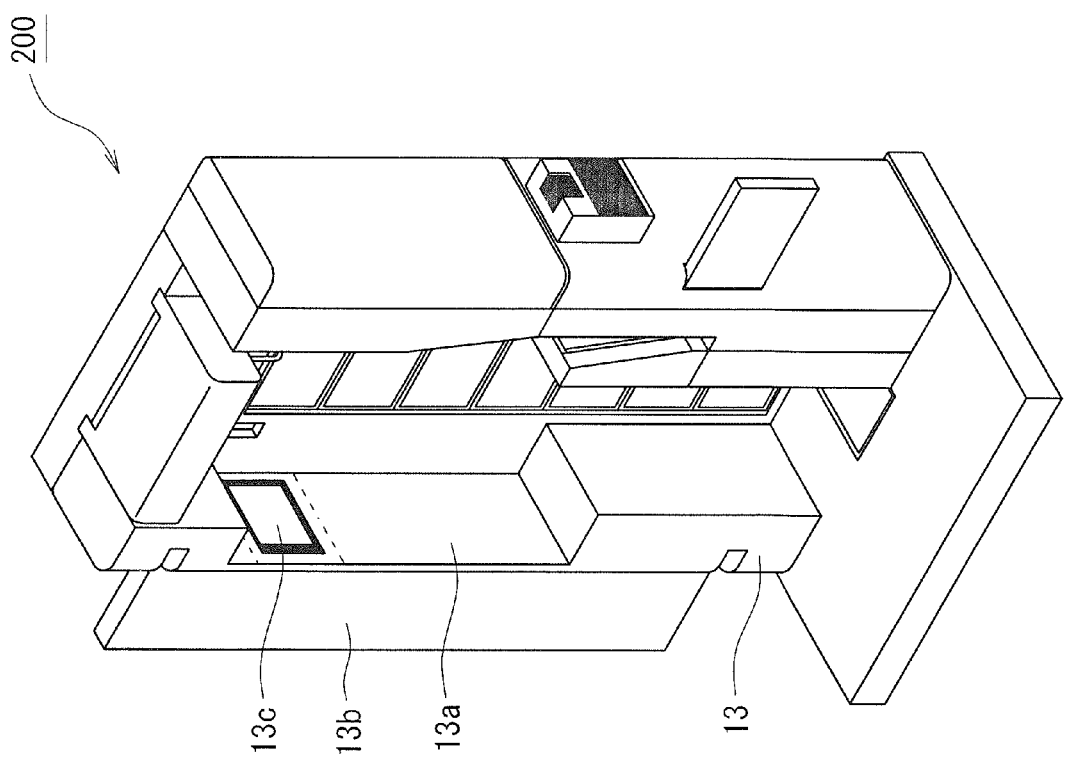
Figure 16B:
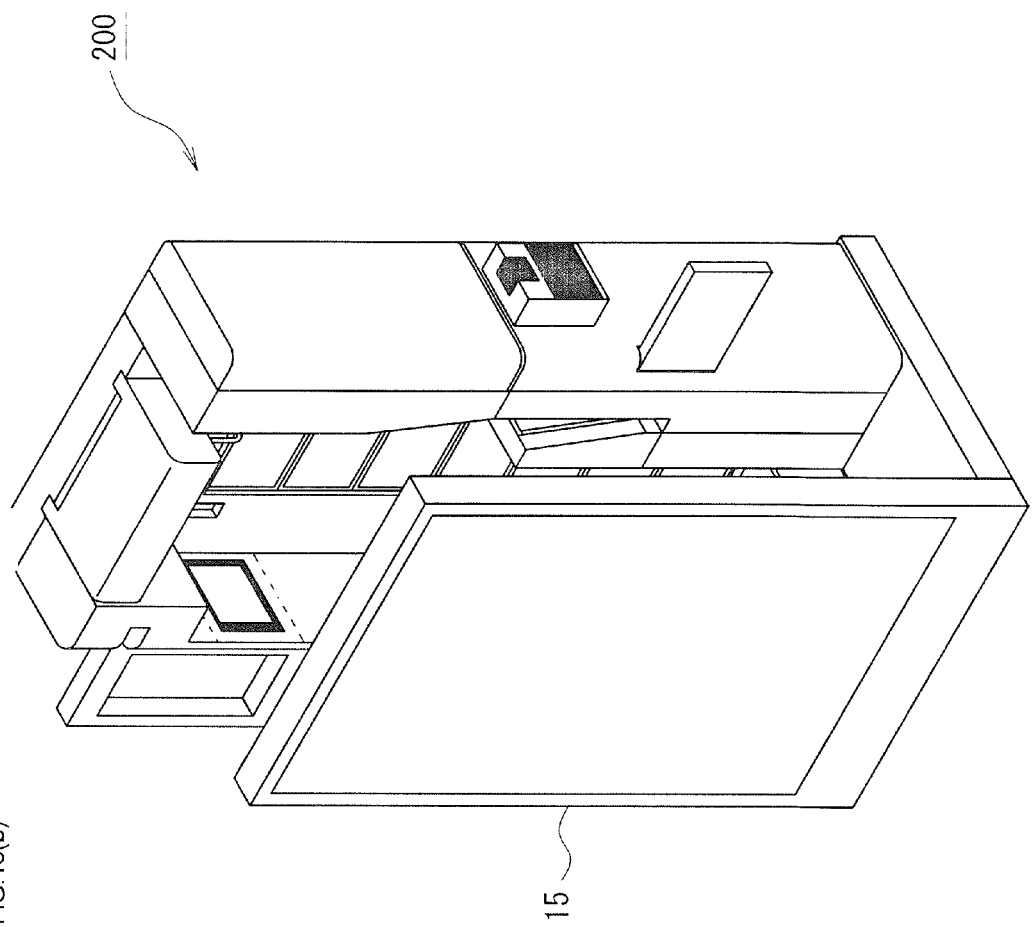
FIGS. 16(a) and 16(b) show explanatory views of replacement of modules of an exit monitor.
Figure 16A:
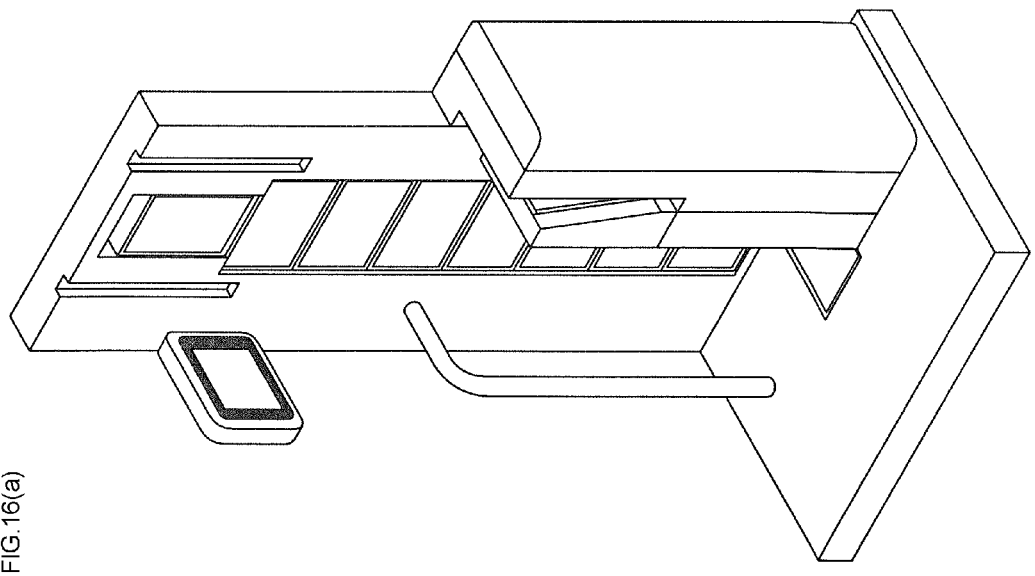

The exit monitor 200 in which these configurations are incorporated has a configuration as illustrated in FIGS. 14(a) and 14(b).

Furthermore, as illustrated in FIG. 15, a partition 15 may be provided to the exit monitor 200. The partition 15 is a vertical partition wall and is provided as the boundary between a controlled zone and a non-controlled zone. The exit monitor 200 is provided over the controlled zone and the non-controlled zone.

As above, since the high-functional exit monitor 200 as illustrated in FIGS. 12 and 13 can be configured by replacing modules of the exit monitor 100 having the simplest configuration as illustrated in FIGS. 1 and 2, it is easy to extend the functions.

Subsequently, detection of contamination by the exit monitor 200 of the present embodiment will be described.

When a worker attaches a dosimeter to the dosimeter reader 12, the exit monitor 200 enters the ON state. The gate 11a of the gate attached arm's outer side surface monitoring unit 11 is opened so that the worker can enter the inside of the monitor. At the same time, the background (BG) value is measured. Subsequently, the worker stands on a monitoring position. In this case, the worker steps on the sole monitoring unit 5 so that the front surface of the worker contacts the front and back surface monitoring unit 2, and the right side surface of the worker contacts the body's side surface monitoring unit 3. Moreover, the palm of one hand of the worker contacts the arm's inner side surface monitoring unit 31b, and the back of the hand contacts the hand monitoring unit 11b. Concurrently, the head monitoring unit 14 falls down to the head position of the worker.

Moreover, monitoring of contamination due to radioactive substances starts in response to the operation on a switch (not illustrated) or the like, for example. The open and closed state of the gate 11a is checked, and the gate 11a is closed if it is open. The central processing unit 9 receives detection signals from the front and back surface monitoring unit 2, the trunk's side surface monitoring unit 31$a$, the arm's inner side surface monitoring unit 31$b$, the leg's side surface monitoring unit 32, the hand sensor unit 11$b$, the arm sensor unit 11$c$, the forearm sensor unit 11$d$, and the sole monitoring unit 5.

In this case, the central processing unit 9 controls the lift driving unit 8 so that the armpit's both side monitoring unit 3 moves up. When the armpit's both side monitoring unit 3 starts moving up, the trunk's side surface monitoring unit 31$a$ monitors the surface contamination state of the body's side surface ranging from the waist of the worker to the armpit, and the arm's inner side surface monitoring unit 3$b$ monitors the surface contamination state of the arm's inner side surface ranging from the palm on the inner side of the worker's arm to the armpit.

Moreover, the hand sensor unit 11$b$, the arm sensor unit 11$c$, and the forearm sensor unit 11$d$ monitor the surface contamination state of the arm's outer side surface ranging from the back of the hand on the outer side of the worker's arm to the shoulder. Moreover, the sole monitoring unit 5 monitors the sole of the worker.

The central processing unit 9 performs detection of contamination due to radioactive substances based on these detection signals. The detection is performed in the single mode or the combined mode as described above.

When the examination result indicates "Normal," the gate 13$b$ (exit) of the gate attached display unit 13 is opened, the worker exits from the exit monitor 200, and the examination ends.

However, when the examination result indicates "Contamination," a warning sound is output, a contaminated portion and the degree of contamination are displayed on a switch or the display unit 13$c$ and are printed out as necessary, and the gate 11$a$ (entrance) of the gate attached arm's outer side surface monitoring unit 11 is opened. The worker exits from the gate 11$a$ (entrance) and washes a contaminated portion and gets examination again by the exit monitor 200. In this way, when an examination result indicating "Normal" is obtained, the worker exits from the gate 13$b$ (exit) of the gate attached display unit 13.

Since the arm's outer side surface is also monitored in the single detector mode and the combined detector mode, it is possible to detect radiation positions including the boundary position between two sensor units, and the detection performance is increased. Moreover, it is easy to extend the functions by replacement of modules. The exit monitor 200 of the present embodiment has such a configuration.

Hereinabove, the exit monitors 100 and 200 of the present invention have been described.

As above, in the exit monitors 100 and 200 of the present invention, in particular, since the armpit's both side monitoring unit 3 is a both side-type sensor and is configured to be lifted in a short period, the armpit's both side monitoring unit 3 can detect contamination of portions ranging from the waist to the armpit and from the arm's inner side surface to the armpit while moving up. Moreover, since the detection ends when the armpit's both side monitoring unit 3 reaches the armpit, it is possible to reliably detect contamination of an armpit portion regardless of the difference in the height of workers.

Moreover, the front and back surface monitoring unit 2 and the body's side surface monitoring unit 3 are formed of a plurality of divided sensor units, and a reliable measurement method regardless of the position of a radiation source is achieved by performing signal processing such as combining signals from these sensor units. Therefore, the area of the individual sensor unit is decreased so as to decrease the influence of the background. By decreasing the detection area of the individual sensor unit, a portion, which is not contaminated but natural radioactive nuclides are attached to a wide and thin area thereof, is made hard to be determined to be "contaminated."

Moreover, even when contamination due to radioactive substances is present near the boundary between divided sensor units, the contamination is detected by the combination mode examination unit that performs monitoring in the combined detector mode based on a combined signal obtained by combining the detection signals output from two adjacent sensor units. In this way, the contamination can be detected, and detection performance is improved.

Moreover, the respective monitoring units can be replaced as a modular configuration and may be configured taking the required detection performance into consideration, thereby improving the cost performance.

The exit monitor of the present invention can be applied to a monitor that examines a contamination state of a body surface of a worker due to radioactive substances when the worker working in a controlled zone of radioactive substance handling facilities exits the controlled zone.

The invention claimed is:

1. An apparatus for examining a contamination state of a body surface of a worker having worked in a radiation controlled zone, comprising:
    a front and back surface monitoring unit that detects contamination of a front or back surface of the worker using a first sensor unit facing the front or back surface of the worker and outputs a first detection signal indicating a contamination state of the front or back surface of the worker,
    a side surface monitoring unit that detects contamination of one side surface of the worker using a second sensor unit facing the one side surface of the body of the worker and outputs a second detection signal and a third detection signal; and
    a central processing unit that performs contamination examination based on the outputted first, second and third detection signals,
    wherein the side surface monitoring unit includes
        an armpit monitoring unit for detecting contamination of both sides of an armpit of the worker, the armpit monitoring unit including
            an arm's inner side surface monitoring unit that detects contamination of an inner side surface of an arm of the worker using a third sensor unit facing the arm's inner side surface and outputs the second detection signal indicating a contamination state of the arm's inner side surface ranging from a palm on the arm's inner side surface to an upper side of the armpit, and
            a trunk monitoring unit that detects contamination of a side surface of a trunk of the worker using a fourth sensor unit facing the trunk's side surface and outputs the third detection signal indicating a contamination state of the trunk's side surface ranging from a waist of the worker to the upper side of the armpit, and
        a lift driving unit that moves up and down the armpit monitoring unit, and
    wherein the central processing unit includes
        a lift control unit that controls the lift driving unit such that the armpit monitoring unit moves up when detecting contamination of the front or back surface of the worker, and a contamination examining unit that detects the presence of contamination of the front or back surface and the armpit's both sides based on the first detection signal output by the front and back surface monitoring unit, on the third detection signal output by the trunk monitoring unit when the trunk monitoring unit moves up, and on the second detection signal output by the arm's inner side surface monitoring unit when moving up together with the trunk monitoring unit.

2. The exit monitor according to claim 1, further comprising a limit sensor disposed in an upper end portion of the armpit monitoring unit and configured to detect an upper limit and to output a fourth detection signal when the limit sensor comes into contact with the upper side of the armpit, wherein the central processing unit is connected to the limit sensor and is configured to determine that the limit sensor is not in contact with the armpit of the worker and to control the lift driving unit such that the armpit monitoring unit moves up continuously until the fourth detection signal is output from the limit sensor, and the central processing unit is configured to receive the fourth detection signal output from the limit sensor and to control, upon receiving the fourth detection output, the lift driving unit such that the armpit monitoring unit stops rising.

3. The exit monitor according to claim 1, further comprising a hand monitoring unit that detects contamination of the back of a hand of the worker using a fifth sensor unit facing the back of the worker's hand.

4. The exit monitor according to claim 1, further comprising an arm's outer side surface monitoring unit that detects contamination of an outer side surface of an arm of the worker using a sixth sensor unit facing the arm's outer side surface.

5. The exit monitor according to claim 1, further comprising a head monitoring unit that detects contamination of a top portion of the worker's head using a seventh sensor unit facing the top portion of the worker's head.

6. The exit monitor according to claim 1, further comprising a sole monitoring unit that detects contamination of the sole of a foot of the worker using an eighth sensor unit facing the sole of the worker's foot.

7. The exit monitor according to claim 1, wherein each of the front and back monitoring unit, the side surface monitoring unit, the arm's inner side surface monitoring unit and the trunk monitoring unit is formed by arranging a plurality of planar sensor units.

8. The exit monitor according to claim 7, wherein the central processing unit includes a single mode examination unit that performs examination in a single detector mode in which monitoring is performed based on a particular detection signal output from a particular sensor unit, and a combination mode examination unit that performs examination in a combined detector mode in which monitoring is performed based on a combined signal obtained by combining respective detection signals output from two adjacent sensor units.

9. The exit monitor according to claim 1, wherein each of the front and back monitoring unit, the side surface monitoring unit, the arm's inner side surface monitoring unit and the trunk monitoring unit is replaceable as a modular configuration.

10. The exit monitor according to claim 3, further comprising a bottom surface, wherein a concave portion is defined by the arm's inner side surface monitoring unit, the hand monitoring unit and the bottom surface, and is adapted to receive a hand of the worker.

11. The exit monitor according to claim 8, wherein the combination mode examination unit, when the detection signals output from the two adjacent sensor units are both larger than a measured background value and are substantially the same as each other, detects that a position at the boundary between the two adjacent sensor units is contaminated.

12. The exit monitor according to claim 8, wherein the combination mode examination unit, when the detection signals output from the two adjacent sensor units are both larger than a measured background value and the detection signal of one of the two adjacent sensor units is larger than the detection signal of the other of the two adjacent sensor units, detects that a position at the boundary between the two adjacent sensor units is contaminated and that a surface facing the one of the two adjacent sensor units is contaminated.

13. An apparatus for examining a contamination state of a body surface of a worker having worked in a radiation controlled zone, comprising:

a front and back monitoring unit configured to detect contamination of a front or back surface of the worker and output a first signal indicating a contamination state of the front or back surface;

an arm's inner side surface monitoring unit configured to detect contamination of an inner side surface of an arm of the worker and output a second signal indicating a contamination state of the arm's inner side surface;

a trunk monitoring unit configured to detect contamination of a side surface of a trunk of the worker and output a third signal indicating a contamination state of the trunk's side surface;

a lift driving unit that moves up and down the arm's inner side surface monitoring unit and the trunk monitoring unit; and a processing unit configured to control the lift driving unit such that the arms inner side surface monitoring unit and the trunk monitoring unit move up together, to detect the presence of contamination of the front or back surface based on the outputted first signal, and to detect, when the arm's inner side surface monitoring unit and the trunk monitoring unit together move up, the presence of contamination of both sides of an armpit of the worker based on the outputted second signal and the outputted third signal.

\* \* \* \* \*